| Ring Counter | 0° & 360° | 60° | 120° | 180° | 240° | 300° |
|---|---|---|---|---|---|---|
| A | + | − | − | − | + | + |
| B | + | + | + | − | − | − |
| C | − | − | + | + | + | − |

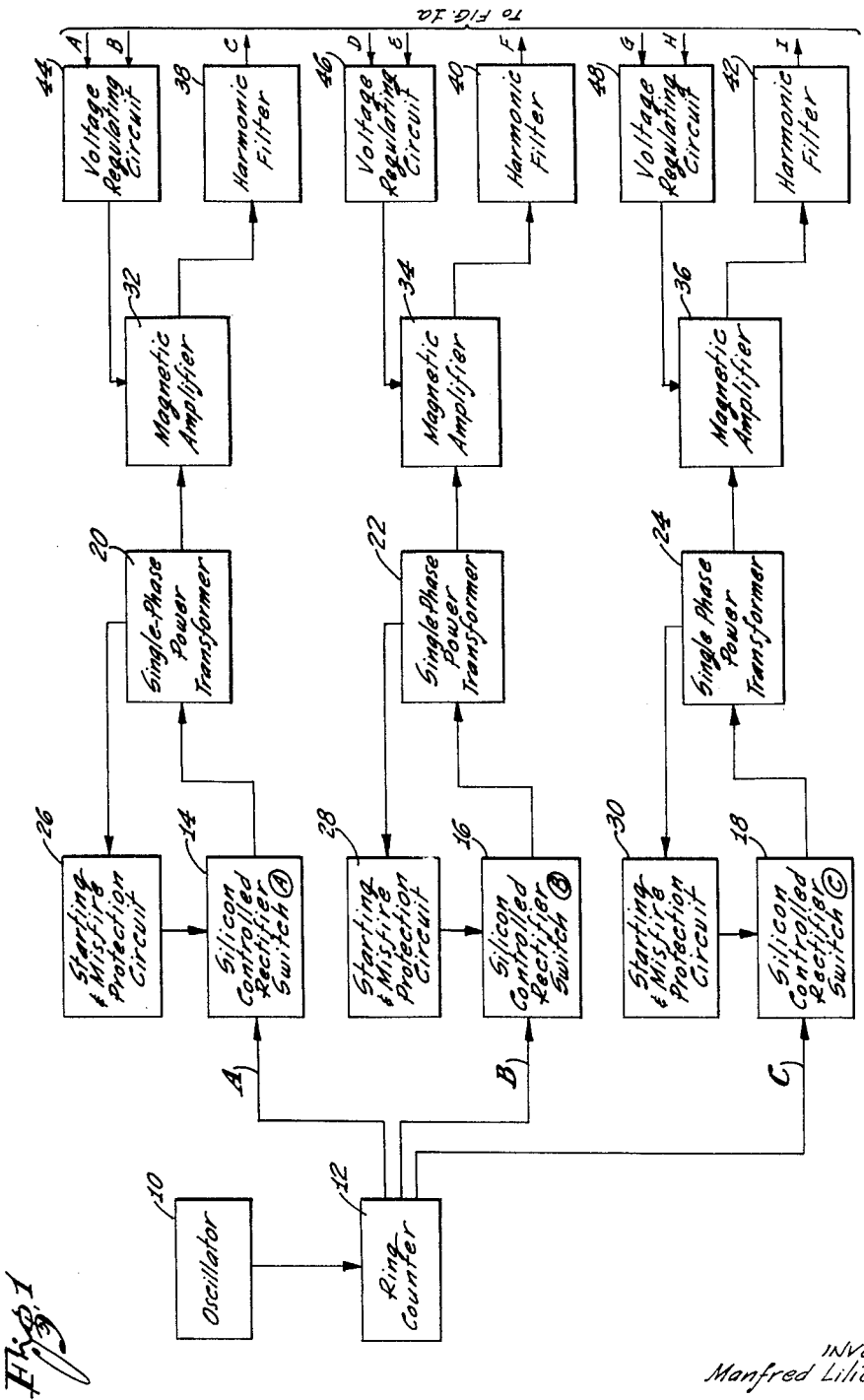

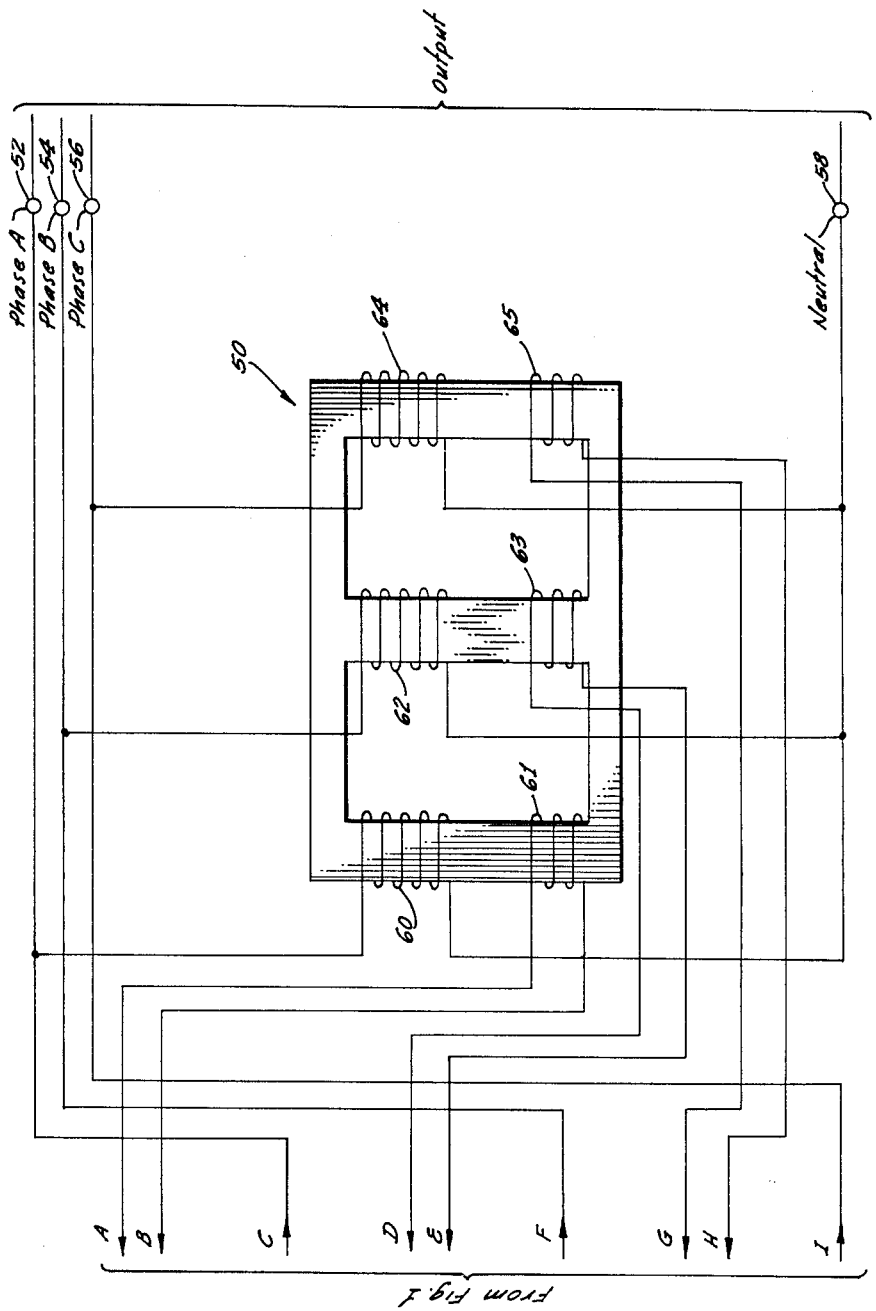

Fig. 3 — Silicon Controlled Rectifier Switching Circuit —14—

INVENTOR:
Manfred Lilienstein
Warren T. Jessup
Attorney

Feb. 2, 1965  M. LILIENSTEIN  3,168,692
STATIC INVERTER
Filed March 1, 1961  6 Sheets-Sheet 4
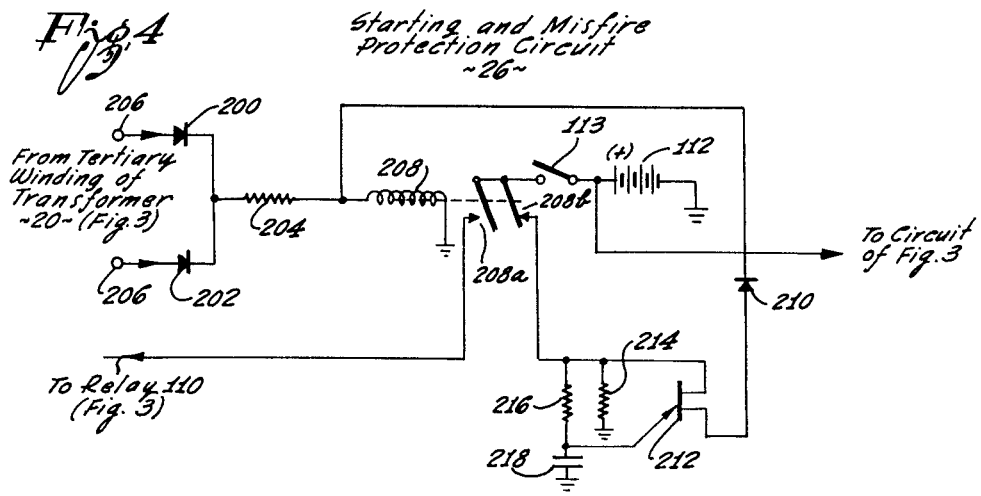
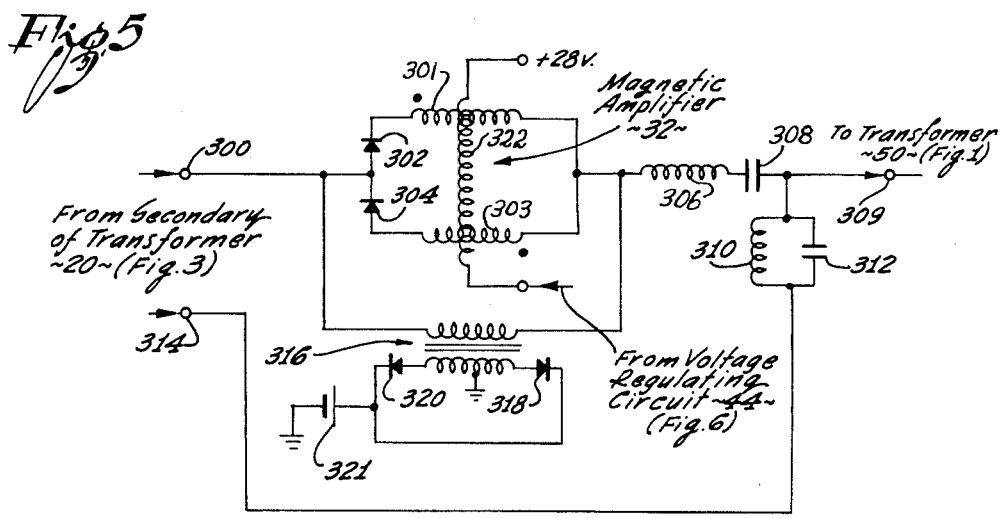
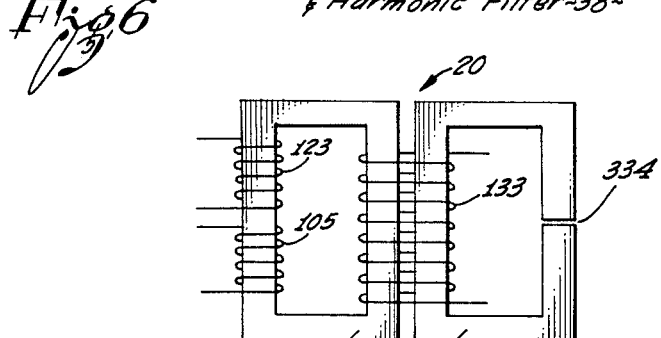
INVENTOR:
Manfred Lilienstein
By Warren T. Jessup
Attorney INVENTOR:
Manfred Lilienstein
By Warren T. Jessup
Attorney.

Fig. 8

United States Patent Office 3,168,692
Patented Feb. 2, 1965

3,168,692
STATIC INVERTER
Manfred Lilienstein, Rolling Hills, Calif., assignor to American Electronics, Inc., Los Angeles, Calif., a corporation of California
Filed Mar. 1, 1961, Ser. No. 92,706
2 Claims. (Cl. 321—5)

The present invention relates to inverter systems and apparatus, and it is more particularly concerned with a static inverter for changing, for example, direct current power into alternating current power.

The embodiment of the invention to be described is in the form of a three phase power supply which is excited by a direct current input and which produces a three phase alternating current output, this being achieved by static elements only, no rotating or other movable parts being used.

The static type of inverter with which the present invention is concerned is advantageous over the usual types of rotating machinery. This is because static inverters are lighter than rotating machinery, they require less servicing and do not utilize moving commutator and brush combinations.

Static inverters are also more rugged and immune to shock or vibration than the rotating type. In addition, static inverters have no heavy rotors or stators. Static inverters are also advantageous in that they lend themselves to printed circuit design and mass production methods.

It is an object of the present invention to provide a new and improved inverter system and unit of the static type which utilizes less component parts than most prior art systems of this general type and yet which operates with a high degree of efficiency and at a relatively high power level.

Another object of the invention is to provide such an improved static inverter system and unit which is rugged in its construction and operation, both mechanically and electrically, so as to be relatively immune from mechanical shock and vibrations, and to be susceptible to high electrical overload capacity.

Another object of the invention is to provide such an improved static inverter system for providing a multi-phase output, and in which the relative amplitudes and phases of the output signals are precisely controlled and maintained at predetermined values.

Another object of the invention is to provide such an improved static inverter system which utilizes silicon controlled rectifier switching circuits, and in which the switching circuits are gate signal controlled in an improved manner to produce a multi-phase output of relatively high power.

Yet another object of the invention is to provide such an improved static inverter system in which means are provided for attenuating any high amplitude spike signals which may be produced therein so as to eliminate any possibility of damage due to such signals.

A further object of the invention is to provide such an improved static inverter system in which the likelihood of double firing, or of misfiring, of the silicon controlled rectifiers in any of the silicon controlled rectifier switching circuits is reduced to a minimum, and in which any adverse or damaging effect on the system due to such double firing or misfiring is prevented.

Other objects and advantages which are believed to be new are set forth in the claims. The invention itself, however, may best be understood by reference to the following description when taken in conjunction with the accompanying drawings in which:

FIGURES 1 and 1A represent a schematic block diagram of a three-phase static inverter system constructed in accordance with one embodiment of the invention, this diagram also showing in circuit form, a regulating transformer used in the system;

FIGURE 3 is a circuit diagram of a silicon controlled rectifier switching circuit which is included in the system of FIGURE 1;

FIGURE 4 is a circuit diagram appropriate for forming one of a plurality of protection circuits used in the system of FIGURE 1;

FIGURE 5 is a magnetic amplifier circuit which may be used for regulating purposes in the system of FIGURE 1;

FIGURE 6 is a fragmentary diagram in schematic form of a transformer which may be used in the system of FIGURE 1, and which may be modified to serve a dual function, as will be described;

FIGURE 8 is a circuit diagram of a ring counter which, likewise, may be used in the system of FIGURE 1.

Figures 2, 3A:
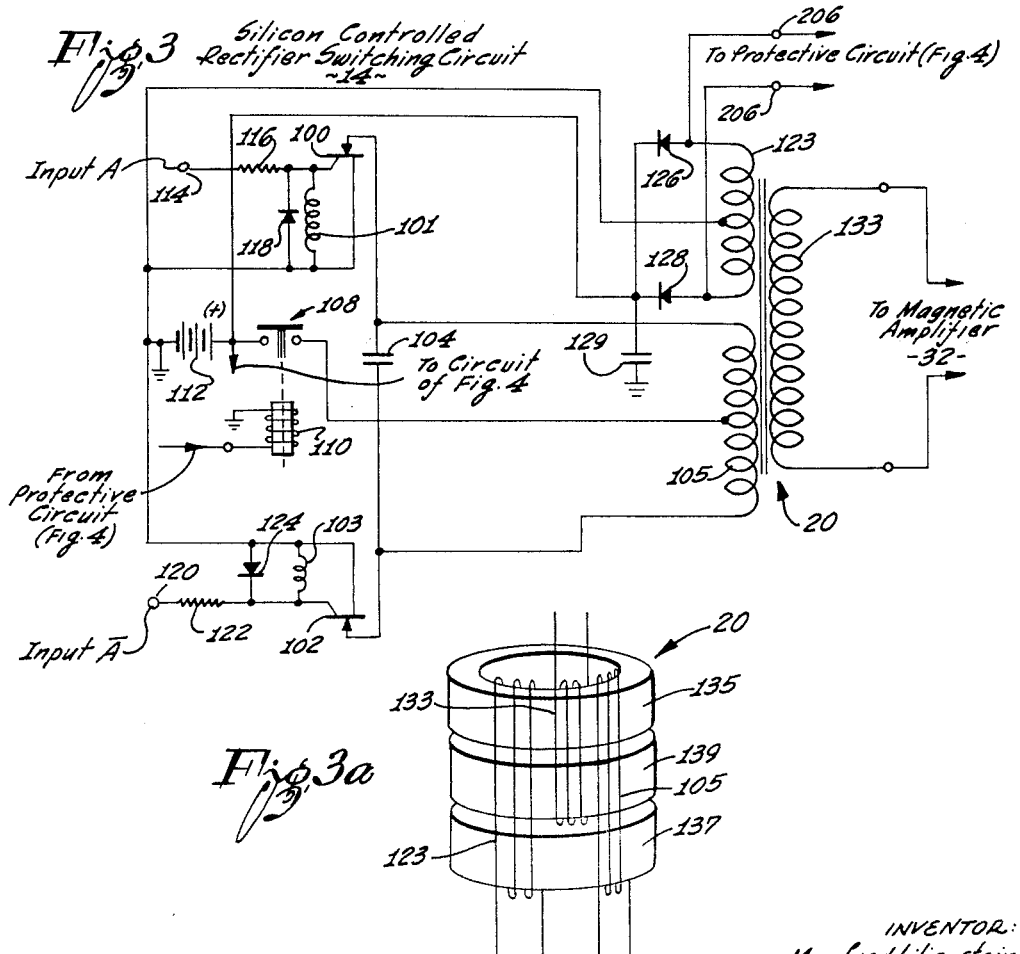
FIGURE 2 is a table showing the relative polarities of the three output signals derived from a ring counter included in the system of FIGURE 1.
FIGURE 3A shows an appropriate core assembly for a transformer used in the circuit of FIGURE 3.

The static inverter system of FIGURES 1 and 1A is a 3-phase type. It includes an oscillator 10 which is coupled to a ring counter 12. The ring counter 12, in turn, is coupled to a group of three silicon controlled rectifier switches, which are designated 14, 16 and 18 respectively.

The silicon controlled rectifier switch 14 is coupled to a single phase power transformer 20, the silicon controlled rectifier switch 16 is coupled to a single phase power transformer 22, and the silicon controlled rectifier switch 18 is coupled to a single phase power transformer 24. The power transformers 20, 22 and 24 are respectively coupled to a group of protection circuits 26, 28 and 30. These power transformers are also respectively coupled to a group of three magnetic amplifiers 32, 34 and 36.

The magnetic amplifiers 32, 34 and 36 are respectively coupled to a group of three harmonic filters 38, 40 and 42. The harmonic filters, in turn, are coupled to respective primary windings 60, 62 and 64 on a three-legged three-phase regulating auto-transformer 50, and to a group of three output terminals 52, 54 and 56. The transformer 50 has respective secondary windings 61, 63 and 65 which are coupled back to the corresponding magnetic amplifiers through respective voltage regulating circuits 44, 46 and 48.

A terminal of the regulating transformer 50 is coupled to a neutral output terminal 58. The phase "A" voltage appears at the output terminal 52, the phase "B" voltage appears at the output terminal 54, and the phase "C" voltage appears at the output terminal 56. Each of these voltages may, for example, be 115-200 volts at 400 cycles.

The system may also be connected in a delta configuration. In the latter configuration the neutral is deleted and each phase is connected singly to the appropriate winding of the transformer 50. Then, the upper terminal of the winding 60 is connected to the phase "A" terminal 52 and to the lower terminal of the winding 62; the upper terminal of the winding 62 is connected to the phase "B" terminal 54 and to the lower terminal of the winding 64; and the upper terminal of the winding 64 is connected to the phase "C" terminal 56 and to the lower terminal of the winding 60.

The oscillator 10 forms the frequency determining element of the system of FIGURE 1; and it may, for example, take the form of a symmetrical Hartley pulse-generating oscillator having, for example, a repetition frequency of 1200 cycles per second. The oscillator produces an output pulse signal which has a repetition frequency of 1200 cycles per second corresponding, for example, to a 2400 cycle per second frequency of the oscillator.

The pulses from the oscillator 10 are applied, either directly or through a frequency divider to the ring counter 12 to cause the ring counter to be activated at the repetition frequency of the pulses. The ring counter 12 may be of any known six element type, and it includes three flip-flop networks. The ring counter supplies gate signals in proper sequence to the silicon controlled rectifier switches 14, 16 and 18 for the three-phase operation of the system. The gate signal outputs from the ring counter 12 are applied to the silicon controlled rectifier switches in the proper repetitive sequence, so that the state of each silicon controlled rectifier switch is changed at the proper times for the desired three-phase operation of the system.

Assume now that the ring counter 12 produces three 400 cycle rectangular-wave alternating current gate signal outputs A, B and C; and that these gate signal outputs are applied to respective ones of the silicon controlled rectifier switches 14, 16 and 18. The rectangular-wave gate signal outputs A, B and C are controlled by the ring counter to have positive and negative values in accordance with the table shown in FIGURE 2. The gate signals A, B and C are effective to cause the silicon controlled rectifier switches 14, 16 and 18 to assume corresponding states during each cycle of operation of the ring counter 12, and to cause the configuration of these states to change each 60 degrees in each cycle, as the polarity of the ring counter signals changes, as shown in FIGURE 2. This results in the silicon controlled rectifier switches producing individual rectangular-wave signals of relatively high power which are displaced from one another by 120 degrees in phase, and whose frequency is controlled by the oscillator 10.

The rectangular-wave signals from the silicon controlled rectifier switches 14, 16 and 18 are fed to corresponding ones of the three single-phase power transformers 20, 22 and 24. These transformers each serve, for example, to raise the rectangular-wave voltage from the corresponding silicon controlled rectifier switches from 26 volts, for example, to approximately 150 volts, for example. The rectangular-wave voltage appearing across the secondary of each of the transformers 20, 22 and 24 is then applied to the corresponding one of the magnetic amplifiers 32, 34 and 36 for regulation before entering the harmonic filters.

The magnetic amplifiers 32, 34 and 36 each delays slightly a part of the leading edge of the corresponding rectangular-wave signal from the transformers 20, 22 and 24; and the filters 38, 40 and 42 attenuate the harmonics of the signals from the magnetic amplifier to produce output signals of sinusoidal wave form.

It will be understood from the description thus far that the oscillator 10 causes the ring counter 12 to control the silicon controlled rectifier switches 14, 16 and 18 at a particular frequency. This control proceeds at a rate such that the silicon controlled rectifier switches produce three rectangular-wave output signals whose individual frequency is one-third that of the oscillator 10, or 400 cycles per second in the embodiment being described. Moreover, these output signals are displaced in phase from one another in the embodiment under consideration by 120 degrees.

The voltage regulation circuits 44, 46 and 48 serve to regulate the voltage of each of the three phases of the system, as represented by the three signals passing through the magnetic amplifiers 32, 34 and 36 to the harmonic filters 38, 40 and 42. This regulation in the embodiment being described is, for example, to 115–200 volts for each phase.

When the signals of the three phases finally reach the regulating transformer 50, they may not be phase displaced exactly 120 degrees. The regulating transformer 50 serves to correct for any phase discrepancy between the signals. This is achieved in a manner to be described.

The regulating transformer 50, as mentioned above, is a three-legged three-phase auto-transformer. The transformer includes the primary winding 60 on one leg, the primary winding 62 on the center leg, and the primary winding 64 on the third leg. These primary windings have one of their sides all connected together and to the neutral output terminal 58. The other sides of the primary windings 60, 62 and 64 are connected to respective ones of the leads from the harmonic filters 38, 40 and 42; these leads extending to the respective output terminals 52, 54 and 56.

Provided that the voltages of each of the signals of the three phases are equal, as established by the voltage regulation action of the voltage regulating circuits 44, 46 and 48, the three-phase regulating auto-transformer 50 serves to provide an exact 120 degree phase shift between the three output signals applied to the output terminals 52, 54 and 56 respectively.

The three-phase regulating auto-transformer 50 is supplied by three sources, namely, the three harmonic filters 38, 40 and 42. The sum of the fluxes in the three legs of the auto-transformer must add up to zero. Therefore, if the three voltages applied to the primary windings 60, 62 and 64 are exactly equal in magnitude and approximately 120 degrees out of phase, the three-phase core of the transformer 50 will equalize the voltages to an exact 120 degrees phase relationship.

Specifically, if the signal of one of the three phases should be slightly more or less than 120 degrees out of phase with the other two signals, the signals of the other two phases will supply reactive energy into the signal of the displaced phase so as to bring it back to the desired 120 degree mutual phase relationship.

A suitable circuit for the silicon controlled rectifier switch 14 and for the single-phase power transformer 20 associated therewith is shown in FIGURE 3. It is to be understood that the silicon controlled rectifier switches 16 and 18, and their associated power transformers 22 and 24, may have the same circuitry, as circuits 14 and 20, respectively.

The circuit of FIGURE 3 includes a first silicon controlled rectifier 100 and a second silicon controlled rectifier 102. These silicon controlled rectifiers may be of any suitable known type. As is well known, the silicon controlled rectifiers may be individually controlled to function as switches capable of switching relatively high power levels.

The primary winding 105 of the transformer 20 has one side connected to the anode of the silicon controlled rectifier 100, and has its other side connected to the anode of the silicon controlled rectifier 102. A capacitor 104 is connected across the winding 105. The primary 105 also has a center tap connected to a pair of normally-open relay contacts 108 controlled by a relay 110. These normally-open contacts are also connected to the positive terminal of a battery 112, the negative terminal of which is grounded.

The cathode of the silicon controlled rectifier 100 is grounded; as is the cathode of the silicon controlled rectifier 102. The circuit of FIGURE 3 includes a first input terminal 114 which is connected through a resistor 116 to the gate electrode of the silicon controlled rectifier 100.

A diode 118 has its cathode connected to the gate electrode of the silicon controlled rectifier 100, and the anode of the diode 118 is grounded.

A second input terminal 120 is connected through a resistor 122 to the gate electrode of the silicon controlled rectifier 102. A diode 124 has its cathode connected to the gate electrode of the silicon controlled rectifier 102, and the anode of the diode is grounded.

The input terminals 114 and 120 are connected to the ring counter 12 in FIGURE 1. The output signal A, as designated in FIGURE 1 is introduced to the input terminal 114, and an oppositely phased signal $\overline{A}$ is applied to the input terminal 120.

The single-phase power transformer 20 also includes a tertiary winding 123, the ends of which are connected to the anodes of respective ones of a pair of diodes 126 and 128. The tertiary winding is wound as close to the primary as possible to reduce leakage and give maximum effectiveness to the operation of the tertiary winding. The cathodes of the diodes are connected together, to a grounded filter capacitor 129, and to the positive terminal of the source 113. This positive terminal is also connected to the normally-open relay contacts 108. The center tap of the tertiary winding 123 of the transformer 20 is grounded.

The basic silicon controlled rectifier switching circuit of FIGURE 3 is similar in some respects to the thyratron type of switching circuit. When the non-conductive silicon controlled rectifier is first rendered conductive, the conductive silicon controlled rectifier is rapidly driven to a non-conductive state, due to the discharge of the capacitor 104 through the conductive silicon controlled rectifier, as will be described.

Assuming that the silicon controlled rectifier 100 is conductive and that the silicon controlled rectifier 102 is non-conductive, then to render the rectifier 100 non-conductive and the rectifier 102 conductive, the gate signal introduced to the base or triggering electrode of the silicon controlled rectifier 100 must be swung from its positive to its negative half-cycle, and the gate signal applied to the base or triggering electrode of the rectifier 102 must be swung from its negative half-cycle to its positive half-cycle.

The single-phase power transformer 20 is wound so that its primary exhibits a relatively high inductance in the circuit. When the silicon controlled rectifier 102 begins to conduct, and current starts discharging from the capacitor 104, there is little increase in primary current in the transformer 20 because of its relatively high inductance. The anode or collector current of the rectifier 100, however, is rapidly brought to zero by a pulse through the capacitor 104, as the capacitor rapidly discharges to ground through the now conductive rectifier 102. The capacitor 104 then charges in the opposite direction. This reverse charging action of the capacitor 104 occurs when the input signals applied to the gate electrodes of the silicon controlled rectifiers 100 and 102 swing to their respective positive and negative half-cycles.

In the above-described manner, and under the control of the rectangular-wave input signals, the silicon controlled rectifiers 100 and 102 serve to switch the relatively high current from the battery 112 through the primary winding of the transformer 20. This results in a relatively high power signal at the secondary of the transformer.

The ratio of turns between the primary 105 and tertiary 123 windings of the transformer 20 is approximately 1:1, although the tertiary may have a few turns less than the primary. The purpose of the tertiary winding is to reduce the amplitude of transient high amplitude voltage spikes that may occur across the primary, and also to assist the switching action in the presence of reactive loads.

Any tendency for a voltage transient spike to be produced across the primary winding of the transformer 20, causes a corresponding voltage to be induced into the tertiary of the transformer. This latter voltage is fed back to the battery 112 through the rectifier diodes 126, 128. Therefore, the alternating-current voltage appearing across the tertiary winding 123 of the transformer 20 cannot exceed the voltage of the battery 112. It follows that any voltage spike appearing across the tertiary winding which is above battery level will be shunted immediately into the battery.

The tertiary winding 123 of the transformer 20 and its associated circuit, therefore, serves as a safety feature in the system, in that it prevents large transient voltage spikes from appearing across the primary winding and being introduced thereby to the silicon controlled rectifiers 100 or 102. Such spikes could damage the silicon controlled rectifiers, or cause the non-conductive silicon controlled rectifier 100 or 102 to break down and thereby produce double, or phantom, firing.

The tendency for a high voltage spike to occur in the circuit of FIGURE 3, however, produces a voltage across the tertiary winding exceeding that of the battery 112. The resulting current flow in the tertiary winding would produce a sudden load on the transformer 20 and thus absorb the energy of the spike. This prevents the amplitude of the voltage spike from building up to a large value across the primary winding of the transformer, with the resulting above-mentioned adverse affects on the switching rectifiers.

The filter capacitor 129 serves to smooth the spike potentials which tend to appear across the tertiary, and this capacitor also serves to compensate for inductive load impedance in the leads from the battery 112.

A feature of the system of the invention is that the silicon controlled rectifier switches 100 and 102 are gated by rectangular waves rather than triggering pulses. In the system, each of the rectangular waves has a positive half-cycle which persists for the entire interval during which the corresponding silicon controlled rectifier is to be conductive, and a negative half-cycle which persists for the entire interval during which the silicon controlled rectifier is to be non-conductive. In the three phase system under consideration, each of these rectangular waves persists in each of its half-cycles for the full 180 degrees. This is an advantage over pulse switching, as will be explained, because of the reactive nature of the loads with which the system of the invention is usually associated.

Assume now that a load with a lagging power factor is placed on the secondary 133 of the transformer 20, and that the silicon controlled rectifier 100 is conductive and the silicon controlled rectifier 102 is non-conductive. Then, when the input signals cause the silicon controlled rectifier 102 to become conductive, and the rectifier 100 to become non-conductive, this results in a surge of current passing through the capacitor 104 so that the rectifier 100 is rapidly cut off.

The lagging current in the primary 105 of the transformer 20, however, still tries to pass through the silicon controlled rectifier 100, which rectifier has been cut off by the action described above. This logging reactive current in the circuit of FIGURE 3 is induced into the tertiary winding and tends to produce a voltage thereacross. Since both the silicon controlled rectifiers 100 and 102 are non-conductive, the primary winding is virtually open and the lagging component of the current in the secondary of the transformer produces an alternating current in the tertiary winding which then is rectified in the diodes 126 and 128 and fed back into the battery. Thus the reactive component of the current flows through the tertiary and is absorbed by the battery.

In other words, if there is a reactive load on the system with a lagging power factor, the following action will occur. Assume first that the silicon controlled rectifier 102 has now received its switching voltage and wants to conduct. This reflects a negative going voltage on the capacitor 104, so that the capacitor is rapidly discharged. However, an induced voltage is fed back to the primary of the transformer 20 from the lagging load current which continues to flow in the secondary of the transformer. This lagging primary voltage bucks the battery voltage which is now trying to reverse the current flow in the primary. This means that there is a short period of time in which the primary winding of the transformer 20 is effectively blocked because current cannot flow through either of the silicon controlled rectifiers 100 or 102. The tertiary winding 123 of the transformer 20, however, serves to reduce the above-mentioned blocked interval of the rectifiers to negligible proportions by rapidly absorbing the reactive current in the primary and quickly causing it to be reduced to zero.

In like manner, in the presence of a load having a leading power factor, primary current will reverse before the silicon controlled rectifier 102 is rendered conductive. Again, the tertiary winding circuit serves to absorb the resulting reactive current, so as to reduce the blocked interval to negligible proportions.

In the above described manner, the tertiary winding of the transformer 20 serves to protect the silicon controlled rectifier switches 100 and 102 from double firing, not only from voltage transient spikes, but also from the effects of reactive loads having leading or lagging power factors.

The tertiary winding, as described, shunts part of the leading or lagging power factor reactive current back into the battery 112. It should be noted that even with a purely resistive load, the unit is improved by the presence of the tertiary winding. This is because the resulting high amplitude transient spikes, which are normally introduced across the primary winding, would acquire such a high amplitude that the silicon controlled rectifiers would intermittently break down, thereby to create a double firing condition.

It is preferable that the core of the transformer 20 be provided with a small air gap, such that when the gate signals are applied to the silicon controlled rectifiers 100 and 102, there is little or no residual magnetism present in the transformer. This is because such residual magnetism creates a possibility of transformer core saturation. The proper switching action of the silicon controlled rectifiers 100 and 102 proceed best only when the core of the transformer 20 is not in a saturated condition.

The circuit details of the starting and misfire protection circuit 26 are shown in FIGURE 4. It is to be understood that the protection circuits 28 and 30 may be similarly constructed.

The circuit of FIGURE 4 includes a pair of diodes 200 and 202. The anodes of these diodes are connected to respective ones of a pair of input terminals 206 which in turn, are connected to the tertiary winding 123 of the transformer 20 in FIGURE 3.

The cathodes of the diodes 200 and 202 are connected through a resistor 204 to one terminal of the energizing coil of a relay 208, the other terminal of which is grounded. A pair of normally-open contacts 208a actuated by the relay 208 are connected to the energizing winding of the relay 110 in FIGURE 3. The other side of the energizing winding of the relay 110 in FIGURE 3 is grounded.

The relay 208 also includes a pair of normally-closed relay contacts 208b. These latter relay contacts are connected to the contacts 208a and through a switch 113 to the positive terminal of the battery 112, and to one of the electrodes of a unijunction transistor 212. The anode of a diode 210 is connected to a second electrode of the transistor 212. The cathode of the diode 210 is connected to the energizing coil of the relay 208.

The first mentioned electrode of the transistor 212 is connected to a grounded resistor 214 and to a second resistor 216. The resistor 216 is connected to a grounded capacitor 218 and to the emitter of the transistor 212. The cathode of the diode 210 is also connected to the junction between the resistor 204 and the energizing coil of relay 208.

If the system of FIGURE 3 is first energized at a time when a full 180 degree rectangular-wave half-cycle first appears across the silicon controlled rectifier 100, then the flux in the transformer 20 will go from zero to some certain value. Afterwards, the average flux in the transformer core will decay to a steady state value. However, should the system first be turned on at a time when less than the full 180 degree rectangular-wave half-cycle appears across the silicon controlled rectifier 100, the transformer flux will not have this high temporary excursion.

It might happen that the transformer 20 will saturate when the system is turned on under the first condition referred to in the preceding paragraph. If so, no switching action will take place, and a misfire condition will result. In that case, both the silicon controlled rectifiers 100 and 102 will conduct permanently and a short circuit condition will result. The circuit of FIGURE 4 provides that the relay 110 will isolate the battery 112 from the circuit of FIGURE 3 in the event of double firing of the silicon controlled rectifiers 100 and 102 due to the above or to any other condition. This prevents damage to the silicon controlled rectifiers in the event of the double firing thereof.

The removal of the battery 112 from the circuit in the event of the short circuit condition is achieved by the action of the relay 110. The relay circuit is designed to have a break time which is related to the battery impedance and voltage, and to the overload current curve of the rectifier. The design should be such, for example, that the relay circuit will operate only in the presence of an overload condition which actually threatens the silicon controlled rectifiers. Upon a misfire condition, such as described above, the relay 110 of FIGURE 3 becomes de-energized, and its contacts 108 open to remove the battery 112 from the circuit. This as mentioned above, prevents any possibility of damage to the silicon controlled rectifiers 100 and 102.

The relay 208 of FIGURE 4 is energized by the rectified voltage supplied by the tertiary winding of the transformer 20 of FIGURE 3, this voltage being supplied by virtue of the action of the rectifier diodes 200 and 202. When the system is operating properly, the rectified tertiary voltage is sufficient to maintain the relay 208 energized. In the event of the above mentioned misfire or double firing condition of the silicon controlled rectifiers, no alternating current signal is fed to the primary of the transformer 20, and therefore no voltage appears across the tertiary winding of the transformer. This means that the voltage supplied to the relay 208 drops, and the relay becomes de-energized. When the relay 208 becomes de-energized, the contacts 208a open to de-energize the relay 110 in FIGURE 3. This causes the relay contacts 108 in FIGURE 3 to open, isolating the battery 112 from the switching circuit.

Therefore, so long as the silicon controlled rectifier switching system of FIGURE 3 is operating properly, the resulting direct current voltage applied to the relay 208 holds the contacts 208a closed. These latter contacts complete the energizing path of the relay 110 in FIGURE 3, so that the relay contacts 108 are held closed.

In the event that a misfire occurs, however, no alternating current appears across the tertiary winding and the relays 208 and 110 become de-energized. This causes the contacts 108 to open and remove the battery from the switching circuit, as described above.

When the system is first energized by closing the battery switch 113 the resulting current pulse from the battery passes through the normally-closed contacts 208b in FIGURE 4 and through the resistor 216 to charge the capacitor 218. As a charge is developed across the capacitor 218 to a predetermined level, the uni-junction transistor 212 breaks down. This permits the capacitor 218 to discharge through the relay energizing coil 208. The discharging capacitor produces sufficient current to flow through the relay coil 208 to close the contacts 208a and to open the contacts 208b. The closing of the contacts 208a causes the relay 110 to become energized so that its contacts 108 are closed.

When the relay contacts 108 are closed, the system of FIGURE 3 is energized, and if the system is operating properly, and alternating current voltage appearing immediately across the tertiary winding of the transformer 20 serves to hold the relay 208 closed, in the manner described above, so that the system of FIGURE 3 can continue to proceed with its switching action. The energizing of the relay coil 208 also causes the relay contacts 208b to open, thereby de-energizing the circuit of the uni-junction transistor.

In the event of a sustained double firing condition, as described above, the voltage across the tertiary winding of the transformer 20 drops to zero and the relay coil 208 is de-energized. This causes the circuit of the uni-junction transistor 212 again to be energized; so that after a predetermined time interval, determined by the resistor 216 and the capacitor 218, the relay 208 is again energized by that circuit.

In the above manner, the relay 208 is repeatedly energized for a few milliseconds at a time. This repeated energizing of the relay 208 continues until the resulting activation of the relay 110 causes a voltage to appear across the tertiary winding 123, indicating that the fault has been removed. As soon as that voltage appears, the relay 208 is held energized, as described above. However, so long as no voltage appears on the tertiary winding of the transformer 20 as a result of any particular closing of the relay 208, the circuit of the uni-junction transistor 212 will cause the relay 208 immediately to drop out again.

In a constructed embodiment of the system of FIGURE 4, the circuit of the uni-junction transistor 212 was designed so that the relay 208 would be energized every one-quarter second for a few milliseconds, this action continuing in the above described manner until the fault is removed.

In summary, therefore, when the battery switch 113 is closed to start up the system, the resulting current flows through the relay contact 208b and initiates charging of the capacitor 218. After approximately 0.1 second, the uni-junction transistor 212 breaks down and passes a short surge of current to the relay 208. The relay 208 is immediately energized, and the contacts 208a close to apply an energizing current to the relay 110 in FIGURE 3 to close the contacts 108 of the latter relay.

As the relay contacts 108 close, power is applied to the silicon controlled switching system of FIGURE 3, and the system starts its switching action. When this switching action begins, power comes back from the tertiary winding of the transformer 20 to the relay 208, to hold that relay energized. Therefore, the relay contacts 108 in FIGURE 3 remain closed.

In the event of a misfire, or double firing condition, the relay 208 will not remain closed, and the contacts 108 in FIGURE 3 will immediately drop out again. The opening time of the contacts 108 is made fast enough, as noted, to prevent any damage to the silicon controlled rectifiers.

Should a continuous fault be present in the system, when the relay 208 pulls in, no voltage will be supplied from the tertiary winding to that relay, and it will immediately drop out again. This action repeats itself, as described, until the fault is cleared and the unit again starts functioning correctly. Therefore, the starting and holding circuit of FIGURE 4 is self-protecting and self-locking. It protects itself and the system of FIGURE 3 from misfiring, double fires and overloads.

The regulating transformer 20 of FIGURE 3 may be constructed to have a tower-type of annular core assembly, as shown schematically in FIGURE 3A. This core assembly may include, for example, an annular top portion 135, an annular bottom portion 137, and an annular central portion 139. The top and bottom core portions may be formed of any known core material appropriate to provide a square hysteresis loop, such as Deltamax. The central core portion, on the other hand, may be constructed of powdered permalloy material to have a relatively non-saturating sloping hysteresis loop.

Another configuration uses only one core which combines the cores 135 and 139, and which has a small air gap.

The tertiary winding 123 is wound around all three core portions and the primary winding 105 is also wound around all three core portions. The secondary winding 133, however, is wound around the upper and central core portions.

This tower design in FIGURE 3A of the transformer 20 serves further to reduce the probability of double firing of the silicon controlled rectifiers. If the Deltamax core alone were used, the magnetic retentivity of that core would tend to produce double firings. However, this type of core is most advantageous in that it has high permeability. The use of a Deltamax core alone, with an air gap formed therein, could reduce double firing, but then the value of its high permeability would be lost. However, a small air gap, of the order of 5 mils, could be used to advantage.

For the above reasons, the use of the multiple core construction, in which the powdered core of low magnetic retentivity is interposed between the two cores of relatively high magnetic retentivity but high permeability permits effective use to be made of the high permeability characteristics of the outer core without the concomitants production of double firings in the silicon controlled rectifiers of the system.

Although the circuit of FIGURE 4 will respond, in the described manner, to a double firing condition of the silicon controlled rectifiers 100 and 102, and damage to the rectifiers is thereby prevented; the actual condition of double firing is undesirable, and the probability of this condition occurring should be reduced as much as possible.

It has been found that if the half-cycles of the rectangular waves from the ring counter 12 causing conduction be removed from one of the silicon controlled rectifiers before that half-cycle is applied to the other, and vice versa, the probability of double firing of the silicon controlled rectifiers is reduced materially. This is because the hiatus between the half-cycle provides time for the capacitor 104 of FIGURE 3 to become charged. It has been found, for example, that by cutting off the leading and trailing edges of the rectangular wave input signals of FIGURE 3 by any appropriate gate circuitry, so that a 60 degree interval appears between each half-cycle of these signals, the likelihood of double firing is materially decreased.

It has also been found that a modification of the input rectangular waves, such that each half-cycle causing conduction has a slightly exponentially decaying waveform, further reduces the likelihood of double firing of the silicon controlled rectifiers in the different pairs. The wave shape of the input signals may be so modified by the inclusion of a pair of grounded choke coils 101 and 103 in the respective base circuits of the silicon controlled rectifiers 100 and 102 in FIGURE 3.

Appropriate circuitry for the magnetic amplifier 32 and the harmonic filter 38 is shown in FIGURE 5. It is to be understood, of course, that similar circuitry may be used for the magnetic amplifiers 34 and 36, and their associated harmonic filters 40 and 42.

The secondary 133 of the transformer 20 of FIGURE 3 has one terminal 300 (FIGURE 5) connected to the input terminal of the magnetic amplifier 32. The magnetic amplifier 32 in the illustrated embodiment includes a pair of gate windings 301 and 303. These windings are wound in the direction indicated by the dots adjacent thereto, and they are connected to the terminal 300 through respective diodes 302 and 304 connected in the illustrated manner.

The other ends of the gate windings 301 and 303 are connected to an inductance coil 306. This inductance coil, and a series capacitor 308 form part of the harmonic filter 38. The series capacitor 308 is connected to an output terminal 309, which, in turn, is connected to the winding 60 of the transformer 50 of FIGURE 1A and to the phase A output terminal 52. The capacitor 308 is also connected to one side of an inductance-capacitance shunt combination which includes an inductance coil 310 shunted by a capacitor 312. The other side of this shunt combination is connected back to the other terminal 314 of the secondary winding 133 of the transformer 20 of FIGURE 3.

The primary winding of a spill-over transformer 316 is connected across the gate windings of the magnetic amplifier 32. The secondary of the transformer 316 has a grounded center tap, and it is connected to the anodes of a pair of diodes 318 and 320. The cathodes of the diodes are connected to the positive terminal of a source of direct current voltage 321, the negative terminal of which is grounded.

The magnetic amplifier 32 also includes a control winding 322, and a pair of balance windings, not shown. The control winding 322 is connected between the positive terminal of a 28 volt direct current source and the output terminals of the voltage regulating circuit 44 of FIGURE 6.

In series with the magnetic amplifier 32 is the combination of the series inductance-capacitance filter combination 306, 308 and the parallel filter inductance-capacitance combination 310, 312. These filter combinations combine to perform the function of the block 38 in FIGURE 1, and their major purpose is to filter out the harmonics in the voltage emanating from the transformer 20, as modified by the magnetic amplifier 31.

The series filter 306, 308 is tuned to the fundamental frequency of the rectangular wave, so as to block the predominant harmonic. The parallel filter 310, 312 is also tuned to the fundamental to provide a low impedance path to the harmonics of the signal and thereby remove the harmonics from the signal introduced to the output terminal 309.

The inductance coil 306 can be formed by a separate element, or the secondary of the transformer 20 can perform the additional function of constituting that inductance element, so that the separate inductance coil 306 can be eliminated. When the secondary is so used, the transformer 20 may be constructed in the manner shown in FIGURE 6. As shown in FIGURE 6, the primary winding 105 and the tertiary winding 123 of the transformer 20 are wound on one leg of a rectangular core 330; and the secondary winding 133 is wound on the other leg of the rectangular core and around a leg of an additional adjacent core 332. The core 332 is provided with an air gap 334.

With the construction illustrated in FIGURE 6, the secondary winding 133 of the transformer 20 has sufficient inductance to function as the inductive element in the series resonant filter combination 306, 308 of the harmonic filter 38, and the circuit can be designed accordingly, with the inductance coil 306 omitted.

The rectangular-wave signal appearing across the secondary of the transformer 20 is passed through the magnetic amplifier 32 for voltage regulation purposes (FIGURE 5). When the signal from the transformer is applied to the magnetic amplifier 32, the amplifier is driven between a fully conductive and a fully non-conductive state. There is a tendency for high voltage spikes to be introduced across the gate windings 301, 303 of the magnetic amplifier during this process. The circuit of the transformer 316 functions in a manner similar to the circuit of the tertiary winding of the transformer 20 in FIGURE 3 to suppress the high amplitude spikes referred to above.

Any tendency for a high amplitude spike to build up across the windings of the magnetic amplifier cause the transformer 316 to tend to produce a voltage across its secondary winding. The extent of this voltage is limited by the potential of the battery 321. Therefore, the resulting current flow in the secondary winding of the transformer 316 produces a load across the magnetic amplifier which absorbs the energy of the voltage spikes, and this causes their amplitude to be maintained below a harmful magnitude.

Figure 5A:
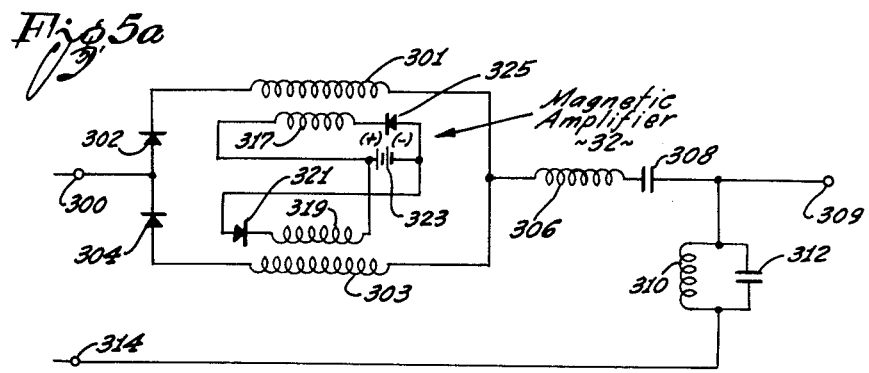
FIGURE 5A is a circuit diagram of a magnetic amplifier, similar to the magnetic amplifier of FIGURE 5, but modified in some respects.

When so desired, the transformer 316 may be replaced by separate spill-over windings in the magnetic amplifier itself. Such a system is shown in FIGURE 5A. Most of the elements of the magnetic amplifier of FIGURE 5A similar to those of FIGURE 5, and have been identified by the same numerals.

In the magnetic amplifier of FIGURE 5 the transformer 316 of FIGURE 5 has been replaced by a first spill-over winding 317 which is inductively coupled to the winding 301, and by a second spill-over winding 319 which is inductively coupled to the magnetic amplifier winding 303. A diode 321 has its cathode connected to one side of the winding 319, and the anode of the diode is connected to the negative terminal of a source of unidirectional potential 323. The other side of the winding 319 is connected to the positive terminal of the source 323.

In like manner, one side of the winding 317 is connected to the cathode of a diode 325. The anode of the diode 325 is connected to the negative terminal of the source 323, and the other side of the winding 317 is connected to the positive terminal of the source.

Whenever there is a tendency for a voltage spike to build up across either the winding 301 or the winding 303 of the magnetic amplifier, a corresponding voltage is induced in the spill-over winding 317 or in the spill-over winding 319. However, the amplitude of this voltage is limited by the source 323, and the resulting current flow through the circuits of the winding 317 or of the winding 319 when the induced voltage tends to exceed the voltage of the battery 323 produces a load on the corresponding one of the windings 301 and 303. This load, in a manner similar to that discussed above, causes the voltage spikes across the windings 301 and 303 to be attenuated to a safe level.

Figure 7:
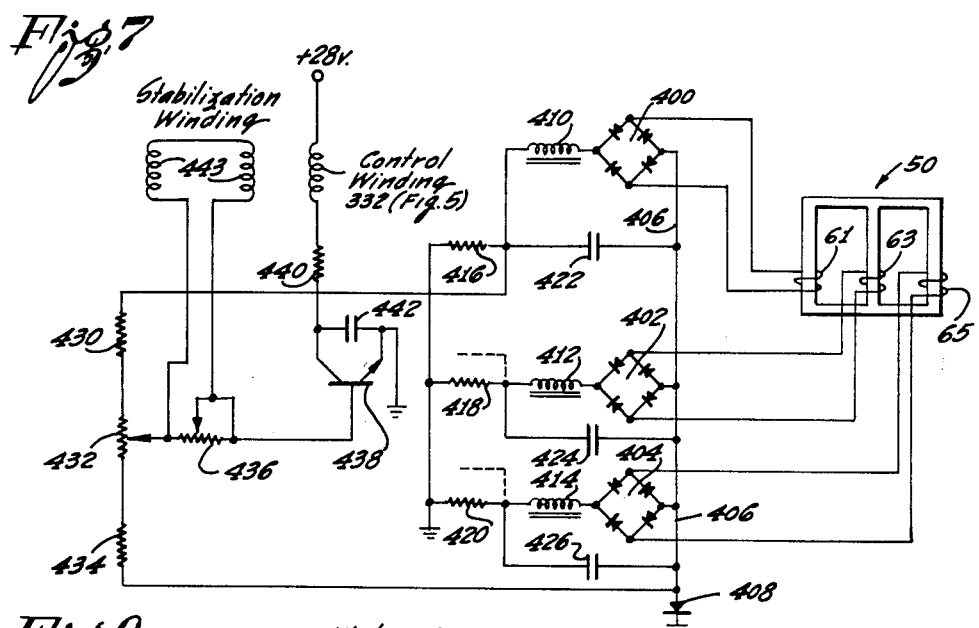
FIGURE 7 is a circuit diagram of an appropriate voltage regulating circuit which may be used in the system of FIGURE 1.

The voltage regulating circuit 44 of FIGURE 1 is shown in circuit detail in FIGURE 7. The circuit of FIGURE 7 also includes portions of the voltage regulating circuits 46 and 48 of FIGURE 1. It is to be understood that the remaining portions of the voltage regulating circuits 46 and 48 may be similar to those of the illustrated voltage regulating circuit 44.

As described above, the transformer 50 of FIGURE 1 has respective secondary windings 61, 63 and 65 on its respective legs. These secondary windings, as shown in FIGURE 7, are connected to respective full wave bridge rectifiers 400, 402 and 404. These bridge rectifiers are all connected to a common lead 406, which is connected through a Zener diode 408 to ground.

The opposite terminals of bridge rectifiers 400, 402 and 404 are respectively connected to three inductance coils 410, 412 and 414. These inductance coils are connected to respective grounded resistors 416, 418 and 420. Each of these resistors may, for example, have a resistance of 150 ohms. A capacitor 422 is shunted across the inductance coil 410 and across the bridge rectifier 400; a capacitor 424 is shunted across the inductance coil 412 and across the bridge rectifier 402; and a capacitor 426 is shunted across the inductance coil 414 and the bridge rectifier 404.

The junction of the inductance coil 410 and of the resistor 416 is connected to a resistor 430 having a resistance, for example, of 40 ohms. The resistor 430 is connected to a potentiometer 432 which has a resistance, for example, of 20 ohms; the potentiometer being connected through a 40 ohm resistor 434 to the lead 406. The movable arm of the potentiometer 432 is connected through a variable resistor 436 to the base of an NPN transistor 438. The emitter of the transistor 438 is grounded, and the collector of the transistor is connected through a resistor 440 to the control winding 322 of the magnetic amplifier 32 in FIGURE 5.

A capacitor 442 is connected between the collector and emitter electrodes of the transistor 438. The variable resistor 436 is connected across a stabilizing winding in series with an inductance in the magnetic amplifier 32 (not shown in FIGURE 5). The setting of this resistor 436 controls the signal on the base of the transistor 438 derived from current flow through the windings 443.

The secondary windings 61, 63 and 65 on the transformer 50 each supply, for example, about 28 volts maximum. These voltages are rectified by the bridge rectifiers 400, 402 and 404. The rectified voltages appear across the resistors 416, 418 and 420. The Zener diode 408 functions as a non-linear stabilizing element, and it is common to all the bridge rectifiers. The Zener diode returns the bridge rectifiers to ground, and any drift in the Zener diode produces an effect common to all three phases and therefore has no adverse affect on the system.

Whenever there is a tendency for one of the output voltages of the three phases of the system to increase or decrease in amplitude with respect to the other two, this tendency is reflected by an increase or decrease in amplitude of the rectified voltage across the corresponding one of the resistors 416, 418 and 420.

Each of the resistors 416, 418, 420 is connected to a different control circuit which, in turn, controls the current through the control winding 322 of the corresponding one of the magnetic amplifiers 32, 34, 36. The control is such that the voltage of the particular phase is compensated in a direction to oppose the tendency described above. In this manner, the voltages of the three phases are precisely regulated and maintained at a constant amplitude value with respect to one another.

The particular control circuit for the phase A voltage is shown in FIGURE 7. This circuit is connected, as described above, across the resistor 416. Similar circuits for the other two phases are connected across the resistors 418 and 420.

The potentiometer 432 is adjusted so that under normal conditions, the current through the control winding 332 of the magnetic amplifier 32 is such that a predetermined amplitude in the voltage of the corresponding phase A is produced. However, should the output in that particular phase increase, for example, the base of the transistor 438 becomes slightly positive in relation to the emitter and current is drawn into the transistor and fed through the control winding 322. This current is in a direction to de-saturate the magnetic amplifier and thereby reduce the output voltage. In this manner, any tendency for the output voltage to change in amplitude is compensated by the compensating control current through the control winding 322.

The capacitor 442 across the collector and emitter of the transistor 438 serves to attenuate voltage spikes that may otherwise appear across the transistor.

As shown in FIGURE 7, stabilization is accomplished by a separate stabilization winding 443 in the magnetic amplifier which is connected by way of a choke across the variable resistor 436. This stabilization winding is inductively coupled to the control winding 322, and derives therefrom a degenerative stabilizing feedback voltage for the base circuit of the transistor 438.

In the described manner, therefore, the three-legged auto-transformer 50 of FIGURE 1 has a number of functions. Firstly, it serves to balance the phase angle between the three phases by its inherent characteristics. If one phase is leading or lagging, the transformer will automatically feed flux to the leg corresponding to that phase from the other two legs which will restore the proper phase relationship. Secondly, the transformer 50 serves to provide regulating voltages through its three secondary windings 61, 63 and 65 as described in FIGURE 7. Thirdly, by putting an air gap in the transformer, it can be used as a choke for the parallel filter portion of the harmonic filters 38, 40 and 42, as also described.

The regulating circuit, as described in conjunction with FIGURE 7 rectifies the voltages from the secondary windings 61, 63 and 65 of the transformer 50. The rectified voltages are then applied to the three bridges 400, 402, 404. These three bridges have one arm which is common, and which is represented by the Zener diode 408. The other arms of the bridges are respectively connected to the resistors 416, 418 and 420. The potentiometer 432, and similar potentiometers are respectively associated with the resistors 416, 418 and 420. The potentiometer 432 serves to balance the bridge, consisting of resistors 416, 430, 434 and Zener diode 408. This bridge controls the current in transistor 438 which, in turn, controls the state of the magnetic amplifier 32.

If one phase should drift in amplitude, the resulting change in the voltage across the corresponding secondary winding 61, 63 or 65 would produce the above described compensation in the corresponding magnetic amplifier, and thereby restore the particular phase to its proper amplitude.

Figure 8:
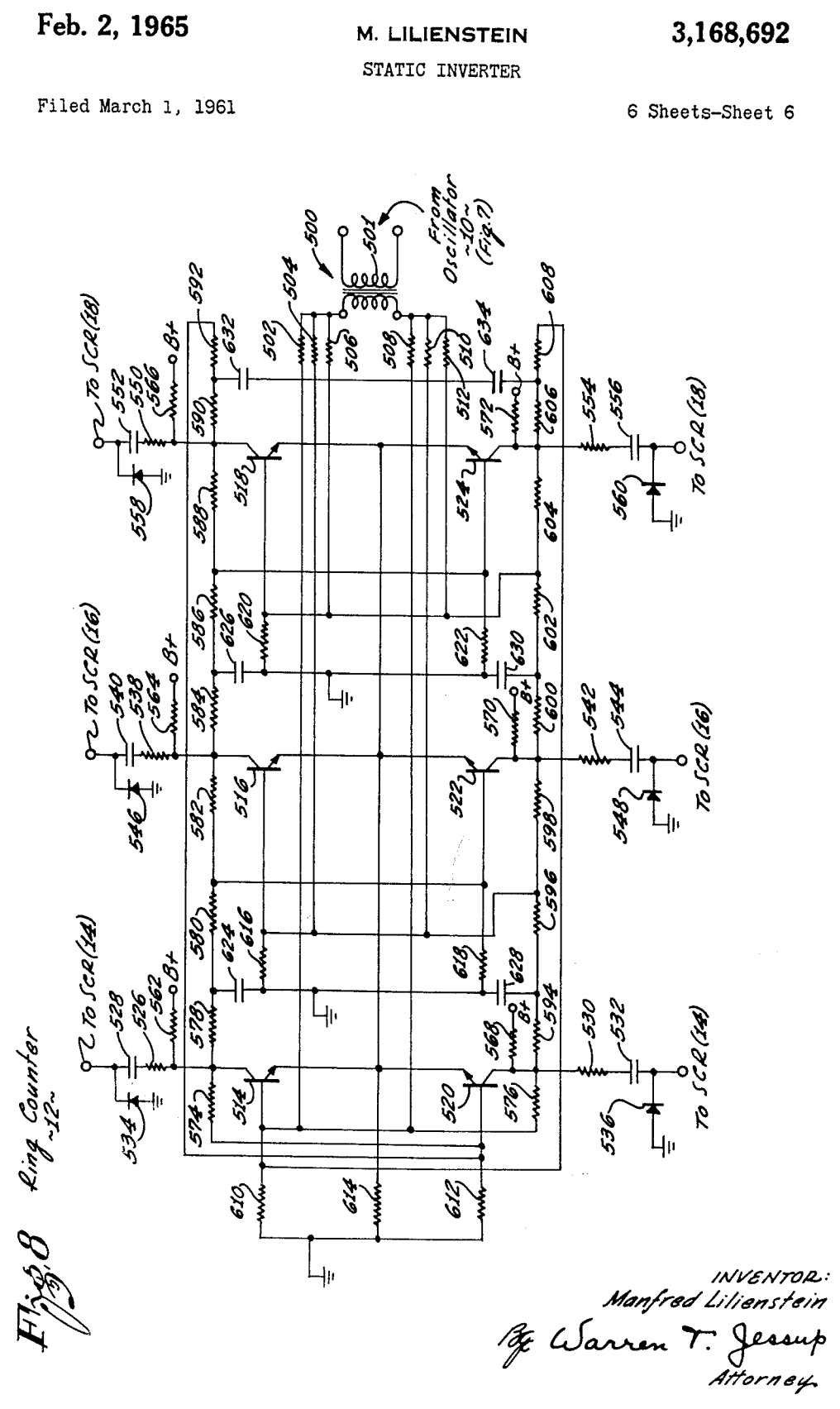

The circuit diagram of FIGURE 8 represents an appropriate configuration for the ring counter 12 of FIGURE 1. As noted above, this ring counter may involve any appropriate circuitry.

The ring counter of FIGURE 8 includes an input transformer 500. The output pulses from the oscillator 10 of FIGURE 7 are introduced to the primary 501 of the transformer 500. The center tap of the secondary of the transformer is grounded. One side of the secondary is connected to a group of three resistors 502, 504 and 506. The other side of the secondary is connected to a group of resistors 508, 510 and 512. Each of these resistors may have a resistance, for example, of 4.7 kilohms.

The resistor 502 is connected to the base of a transistor 514. The resistor 504 is connected to the base of a transistor 516, and the resistor 506 is connected to the base of a transistor 518. The resistor 508 is connected to the base of a transistor 520, the resistor 510 is connected to the base of a transistor 522, and the resistor 512 is connected to the base of a transistor 524. Each of the transistors may be of the NPN type.

The transistors 514 and 520 are connected as a first flip-flop, the transistors 516 and 522 are connected as a second flip-flop, and the transistors 518 and 524 are connected as a third flip-flop. The collector of the transistor 514 is connected through a resistor 526 and through a capacitor 528 to the first output terminal of the first flip-flop, and the collector of the transistor is connected through a resistor 530 and through a capacitor 532 to the second output terminal of the first flip-flop. These two output terminals supply the gate signals A and $\overline{A}$ to the silicon controlled rectifier 14 in FIGURE 1.

The resistor 526 and the resistor 530 each may have a resistance of 200 ohms, for example, and the capacitors 528 and 532 may each have a capacity of 10 microfarads. A diode 534 is connected to the first output terminal of the first flip-flop and to ground, and a diode 536 is connected to the second output terminal and to ground.

The collector of the transistor 516 is connected through a resistor 538 and through a capacitor 540 to the first output terminal of the second flip-flop. The collector of the transistor 522 is connected through a resistor 542 and through a capacitor 544 to the second output terminal of the second flip-flop. These output terminals supply the gate signals B and $\overline{B}$ to the silicon controlled rectifier 16 of FIGURE 1.

The resistor 538 may have a resistance of 200 ohms, and the resistor may have the same resistance. Likewise, the capacitors 540 and 544 may each have a capacity of 10 microfarads. A diode 546 is connected to the first output terminal of the second flip-flop and to ground, and a diode 548 is connected to the second output terminal of the second flip-flop and to ground.

The collector of the transistor 518 is connected through a resistor 550 and through a capacitor 552 to the first output terminal of the third flip-flop. The collector of the transistor 524 is connected through a resistor 554 and through a capacitor 556 to the second output terminal of the third flip-flop. The first output terminal and the second output terminal of the third flip-flop supply the gate signals C and $\overline{C}$ to the silicon controlled rectifier 18 in FIGURE 1.

The resistors 550 and 554 may each have a resistance of 200 ohms, and the capacitors 552 and 556 may each have a capacity of 10 microfarads. A diode 558 is connected to the first output terminal of the third flip-flop and to ground, and a diode 560 is connected to the second output terminal of the third flip-flop and to ground.

The collectors of the transistors 514, 516, 518, 520, 522 and 524 are all connected through respective resistors 562, 564, 566, 568, 570 and 572 to the positive terminal B+ of a source of unidirectional potential. The negative terminal of that source is grounded. Each of these resistors may, for example, have a resistance of 150 ohms.

The collector of the transistor 514 is connected to the base of the transistor 520 through a resistor 574. The collector of the transistor 520 is connected to the base of the transistor 514 through a resistor 576. Each of these resistors may have a resistance of 1 kilohm. The collector of the transistor 514 is connected to the collector of the transistor 516 through three resistors 578, 580 and 582. The resistors 578 and 582 may each have a resistance of 1 kilohm, and the resistor 580 may have a resistance of 1.5 kilohms.

The collector of the transistor 516 is connected to the base of the transistor 522 through the resistor 582. The collector of the transistor 516 is connected to the collector of the transistor 518 through a group of resistors 584, 586 and 588. The resistors 584 and 588 may each have a resistance of 1 kilohm, and the resistor 586 may have a resistance of 1.5 kilohms. The collector of the transistor 518 is connected to the base of the transistor 524 through the resistor 588.

The collector of the transistor 518 is connected to the base of the transistor 514 through a pair of resistors 590 and 592. The resistor 590 may have a resistance of 1 kilohm, and the resistor 592 may have a resistance of 1.5 kilohms.

The collector of the transistor 520 is connected to the collector of the transistor 522 through resistors 594, 596 and 598. The resistors 594 and 598 may each have a resistance of 1 kilohm, and the resistor 596 may have a resistance of 1.5 kilohms. The collector of the transistor 522 is connected to the collector of the transistor 524 through resistors 600, 602 and 604. The resistor 600 and the resistor 604 may each have a resistance of 1 kilohm, and the resistor 602 may have a resistance of 1.5 kilohms. The collector of the transistor 524 is connected back to the cathode of the transistor 520 through a resistor 606 and a resistor 608. The resistor 606 may have a resistance of 1 kilohm, and the resistor 608 may have a resistance of 1.5 kilohms.

The base of the transistor 514 is connected to ground through a resistor 610, and the base of the transistor 520 is connected to ground through a resistor 612. The resistor 610 may have a resistance of 1.2 kilohms, and the resistor 612 may also have a resistance of 1.2 kilohms. The emitters of the transistors 514 and 520 may each be connected to a grounded 10 ohm resistor 614. The emitters of the transistors 516 and 522, and of the transistors 518 and 524 may also be connected to this grounded resistor.

The base of the transistor 516 is connected to a grounded resistor 616, and the base of the transistor 522 is connected to a grounded resistor 618. Each of these resistors may have a resistance of 1.2 kilohms. Likewise, the base of the transistor 518 is connected to a grounded resistor 620, and the base of the transistor 524 is connected to a grounded resistor 622. Each of these latter resistors may have a resistance of 1.2 kilohms.

The junction of the resistors 578 and 580 is connected to a grounded capacitor 624. The junction of the resistors 584 and 586 is connected to a grounded capacitor 626. The junction of the resistors 594 and 596 is connected to a grounded capacitor 628. The junction of the resistors 600 and 602 is connected to a grounded capacitor 630. Each of these grounded capacitors may have a capacity of .068 microfarad. Likewise, the junction of the resistors 590 and 592 is connected to a grounded capacitor 632, and the junction of the resistors 606 and 608 is connected to a grounded capacitor 634. Each of these latter capacitors may also have a capacity of .06 microfarad.

Figure 9:
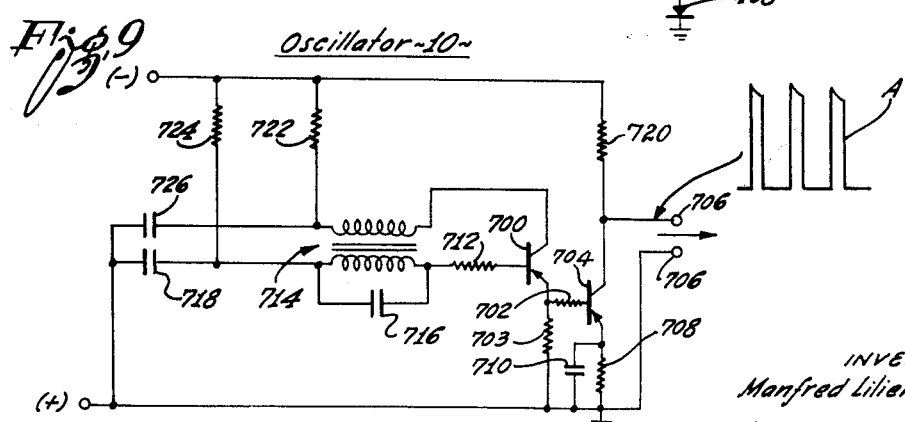
FIGURE 9 is a circuit diagram of an oscillator which may be used in the system of FIGURE 1.

As each pulse from the oscillator 10 of FIGURE 9 is applied across the primary 501 of the transformer 500, positive and negative pulses are produced across each half of the secondary winding. Only the positive pulses are effective, and they appear as recurrent pulse pairs. The first pulse of each pair appears in the group of resistors 502, 504 and 506, and the second pulse in each pair appears in the group of resistors 508, 510 and 512.

The flip-flops in the ring counter 12 are interconnected so that the pulses in the resistors 502, 504, 506 and 508, 510, 512 are effective to trigger the flip-flops successively from one state to another, and in a predetermined sequence. This triggering of the flip-flops is such that the first output terminal of the first flip-flop produces a first rectangular-wave signal "A," and the second output terminal of the first flip-flop produces the rectangular-wave signal "$\overline{A}$" in phase opposition to the rectangular wave signal "A." Likewise, the other flip-flops produce the rectangular wave signals B, $\overline{B}$ and C, $\overline{C}$. The signals A, $\overline{A}$ and B, $\overline{B}$ and C, $\overline{C}$ have a mutual phase relationship which is controlled by the ring counter 12. The outputs from the ring counter are positive and negative in accordance with the table of FIGURE 2, and these outputs control the operation of the silicon controlled rectifier switches, in the manner described above.

Briefly, the ring counter of FIGURE 8 is a six element type. The counter includes three flip-flops respectively formed by the transistors 514 and 520, 516 and 522, and 518 and 524. One transistor of each pair is conductive and the other is non-conductive at any particular time. A pulse introduced to the ring counter circuit from the oscillator 10 produces, as noted, a positive going pulse in the upper three resistors 502, 504, 506, and then a positive pulse in the lower group of resistors 508, 510 and 512.

If it is assumed that the transistors 514, 522 and 524 are non-conductive, and that the transistors 520, 516 and 518 are conductive, and that the transistor 514 has just been triggered into its non-conductive state; then, a positive voltage will appear at the collector of the transistor 514. Since the capacitor 624 supplies a time lag, a short time later a positive voltage will also appear at the base of the transistor 522.

The slightly positive voltage at the base of the transistor 522 is not enough in itself to render that transistor conductive. However, the next positive pulse in the resistor 510 will cause the transistor 522 to be conductive, and its opposite transistor 516 in the flip-flop to be rendered non-conductive.

In this manner, as each transistor is rendered conductive, and its corresponding transistor in its flip-flop non-conductive, the conductive transistor conditions a transistor in another flip-flop for conductivity, so that the latter transistor may be rendered conductive by the next triggering pulse from the oscillator 10. In this manner, the three flip-flops of the ring counter are triggered back and forth in a predetermined sequence.

An appropriate circuit for the oscillator 10 in FIGURE 1 is shown in FIGURE 9. This oscillator includes a transistor 700 which may be of the 2N525 type. The emitter of the transistor 700 is connected to the junction of a pair of resistors 702 and 703. The resistor 703 may have a resistance, for example, of 1 kilohm, and it is connected to the base of a transistor 704. The transistor 704 may also be of the 2N525 type. Both these transistors are PNP transistors.

The collector of the transistor 704 is connected to one of the output terminals 706 of the oscillator, the other output terminal being grounded. The emitter of the transistor 704 is connected to a grounded resistor 708, this resistor being shunted by a capacitor 710. The resistor 708 may have a resistance of 330 ohms, and the capacitor 710 may have a capacity of 2 microfarads.

The base of the transistor 700 is connected to a resistor 712. The resistor 712 may have a resistance of 10 kilohms, and it is connected to the secondary winding of a feedback transformer 714. This winding is shunted by a capacitor 716 which may have a capacity of .5 microfarad. The other side of the secondary winding is connected through a capacitor 718 to the positive terminal of the unidirectional potential exciting source. This latter capacitor may have a capacity of 1 microfarad.

The collector of the transistor 704 is connected through a resistor 720 to the negative terminal of the exciting source, this resistor having a resistance of 1 kilohm, for example. The collector of the transistor 700 is connected through the primary winding of the transformer 714 and through a resistor 722 to the negative terminal of the exciting source. The resistor 722 may have a resistance of 680 ohms.

The secondary winding of the transformer 714 is connected through a resistor 724 to the negative terminal of the unidirectional potential source. This latter resistor may have a resistance, for example, of 150 kilohms. The other side of the primary winding of the transformer 714 is coupled through a capacitor 726 to the positive terminal of the unidirectional potential exciting source. The capacitor 726 may have a capacity, for example, of 5 microfarads.

The system of FIGURE 9, as noted, is a transistorized Hartley oscillator coupled to a transistor amplifier. The oscillator-amplifier produces a series of output pulses A across the output terminals 706. These output pulses should be fed to a frequency divider which is connected to the ring counter 12 of FIGURE 6, or they may be passed through a frequency divider.

By having three individual regulated phases, the static inverter system of the present invention is capable of providing good regulation over a wide load range, and even in the presence of unbalanced loads.

The magnetic amplifiers included in the static inverter system of the invention provide high efficiency reactive regulating elements. The combination of the series and parallel tuned filters in each phase provides essentially pure sine waves in the output with an extremely low harmonic content.

The three-legged three-phase output transformer provides a phase equalizing action even in the presence of drifting and aging in the other components of the system. This transformer also serves as a convenient source for the amplitude regulating voltages.

The static inverter system of the invention is also advantageous in that transient voltage spikes that have a tendency to build up in the system are attenuated to a level at which they cannot create any damage, or produce misfirings or double firings of the silicon controlled rectifiers. Also, provisions are made to reduce the probability of double firing of the silicon controlled rectifiers to a minimum, and to prevent damage in the event of such double firing, and to automatically unblock and restart the system after such double firings.

The invention provides, therefore, a new and improved static inverter system which is rugged and reliable in its operation, and which operates with a high degree of efficiency to attain its intended purpose.

What is claimed is:

1. An electric translating system for transmitting energy from a direct suply circuit to an alternating load circuit comprising:
    (1) an oscillator circuit adapted to convert direct current supply into pulse output;
    (2) ring counter means adapted to receive said pulses and supply a control signal for a plurality of phases in rotation;
    (3) rectifier means for each said phase;
    (4) a single phase transformer connected to receive the output from said rectifier, said transformer having a tertiary winding, a battery connected through converter means to said tertiary winding to damp spikes of voltage appearing in said power transformer;
    (5) a protective circuit having a cut-out switch to stop operation of said rectifier means, said switch having a closed position, relay means operable to close said switch, said switch movable to a cut-out position when said relay means is deenergized, a starting source of power to energize said relay and close said switch, said relay means connected to said transformer tertiary winding for permanent holding power, whereby said switch will maintain said rectifier means in operation only in the event alternating current is available from said power transformer;
    (6) a magnetic amplifier connected to receiver power from the secondary of said power transformer;
    (7) a harmonic filter connected to said magnetic amplifier; and
    (8) a combination phase and voltage regulator in the form of an output transformer having a plurality of legs corresponding to the number of said phases, a primary winding connected from each phase output from said magnetic amplifier, and a secondary from each leg operable through control means to a control windnig of a saturable core voltage throttle of said magnetic amplifier.

2. A system for producing a plurality of multi-phase output signals including:
    an oscillator for producing a pulse signal having a predetermined repetition frequency, ring counter means coupled to said oscillator and responsive to the pulse signal therefrom for recurrently producing in a predetermined sequence a plurality of rectangular wave gate signals, a plurality of silicon controlled rectifier switching circuits coupled to said ring counter and responsive to respective ones of the gate signals therefrom for producing a plurality of rectangular wave signals having a predetermined phase relationship;
    a plurality of transformers coupled to respective ones of said silicon controlled rectifier switching circuits, each of said transformers including a primary winding and a secondary winding and a tertiary winding;
    energy absorbing loading circuit means coupled to said tertiary winding to attenuate any voltage spikes in excess of a predetermined amplitude level appearing across said primary winding;
    said silicon controlled rectifier switching circuits each including a source of uni-directional potential and first protective relay means for connecting said source into the circuit, and circuit means including second protective relay means coupled to said tertiary winding for deactivating said first protective relay means when the voltage across said primary winding drops below a predetermined level, said last named circuit means including a time constant network for recurrently activating said first protective relay means for recurrent predetermined intervals when said voltage across said tertiary winding is below said predetermined level.

References Cited by the Examiner

UNITED STATES PATENTS

| | | | |
|---|---|---|---|
| 2,207,234 | 7/40 | Bohm | 323—50 |
| 2,638,569 | 5/53 | Holt | 321—25 |
| 2,784,365 | 3/57 | Fenemore et al. | 321—36 |
| 2,795,752 | 6/57 | Roberts | 321—25 |
| 2,807,776 | 9/57 | Buechler et al. | 323—89 |
| 2,824,274 | 2/58 | Holt | 321—27 |
| 2,953,735 | 9/60 | Schmidt | 321—5 |
| 2,977,524 | 3/61 | Lingle | 321—45 |
| 3,075,139 | 1/63 | Balteau | 323—89 |
| 3,086,159 | 4/63 | Daly | 323—56 |
| 3,111,632 | 11/63 | Murphy | 321—2 |

OTHER REFERENCES

"Transistorized Three-Phase Power Supplies," by W. Brannian; published in Electronic Industries (January 1959); pages 2–5 relied on.

LLOYD McCOLLUM, *Primary Examiner.*

SAMUEL BERNSTEIN, *Examiner.*